United States Patent
Memon et al.

(10) Patent No.: US 11,860,737 B2
(45) Date of Patent: *Jan. 2, 2024

(54) SYSTEM AND METHOD FOR COORDINATING USE OF MULTIPLE COPROCESSORS

(71) Applicant: Bitfusion.io, Inc., Austin, TX (US)

(72) Inventors: Mazhar Memon, Austin, TX (US); Subramanian Rama, Austin, TX (US); Maciej Bajkowski, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,718

(22) Filed: Mar. 16, 2019

(65) Prior Publication Data
US 2019/0213062 A1    Jul. 11, 2019

Related U.S. Application Data

(63) Continuation of application No. 15/452,724, filed on Mar. 7, 2017, now Pat. No. 10,261,847.

(51) Int. Cl.
| | |
|---|---|
| *G06F 11/14* | (2006.01) |
| *G06F 9/455* | (2018.01) |
| *G06F 11/30* | (2006.01) |
| *G06F 11/20* | (2006.01) |
| *G06F 9/52* | (2006.01) |
| *G06F 11/34* | (2006.01) |
| *G06F 11/07* | (2006.01) |

(52) U.S. Cl.
CPC ...... *G06F 11/1438* (2013.01); *G06F 9/45533* (2013.01); *G06F 9/52* (2013.01); *G06F 11/0751* (2013.01); *G06F 11/14* (2013.01); *G06F 11/1407* (2013.01); *G06F 11/2017* (2013.01); *G06F 11/3024* (2013.01); *G06F 11/3433* (2013.01)

(58) Field of Classification Search
None
See application file for complete search history.

(56) References Cited

U.S. PATENT DOCUMENTS

| | | |
|---|---|---|
| 7,178,049 B2 | 2/2007 | Lutter |
| 2010/0271375 A1 | 10/2010 | Diard |
| 2011/0134132 A1 | 6/2011 | Wolf |

(Continued)

FOREIGN PATENT DOCUMENTS

WO    WO-2018040112 A1 * 3/2018 ............... G06F 9/50

*Primary Examiner* — Chat C Do
*Assistant Examiner* — William C Wood
(74) *Attorney, Agent, or Firm* — Kim & Stewart LLP

(57) ABSTRACT

An interface software layer is interposed between at least one application and a plurality of coprocessors. A data and command stream issued by the application(s) to an API of an intended one of the coprocessors is intercepted by the layer, which also acquires and stores the execution state information for the intended coprocessor at a coprocessor synchronization boundary. At least a portion of the intercepted data and command stream data is stored in a replay log associated with the intended coprocessor. The replay log associated with the intended coprocessor is then read out, along with the stored execution state information, and is submitted to and serviced by at least one different one of the coprocessors other than the intended coprocessor.

19 Claims, 3 Drawing Sheets

(56) References Cited

U.S. PATENT DOCUMENTS

| | | |
|---|---|---|
| 2011/0161943 A1 | 6/2011 | Bellows et al. |
| 2011/0210976 A1 | 9/2011 | Diard |
| 2013/0038615 A1* | 2/2013 | Hendry .................. G09G 5/399 |
| | | 345/502 |
| 2013/0151747 A1 | 6/2013 | Zhang et al. |
| 2013/0155083 A1 | 6/2013 | Mckenzie et al. |

* cited by examiner

SYSTEM AND METHOD FOR COORDINATING USE OF MULTIPLE COPROCESSORS

CROSS-REFERENCE TO RELATED APPLICATIONS

This application is a Continuation of and claims priority of U.S. patent application Ser. No. 15/452,724, filed 7 Mar. 2017, which in turn claims priority of U.S. Provisional Patent Application No. 62/319,867, filed 8 Apr. 2016.

TECHNICAL FIELD

This invention relates to computing systems that include co-processors.

BACKGROUND

As both the extent and complexity of computer processing has grown even in everyday modern life, there is a well-known, ever-increasing need for greater processing power. In many cases, even the increases in processing capability predicted by Moore's Law is insufficient.

One way to increase processing capacity is to distribute the load. "Cloud computing" is one known distribution scheme, in which local systems access shared processing resources such as servers remotely via a network, usually on demand. Although making essentially unlimited resources available, network delays alone preclude use of such an arrangement for many computationally intensive, time-critical or synchronized tasks.

One approach to handling some such tasks is "parallel computing", in which a task is decomposed into discrete sub-tasks that can be performed simultaneously by different processing systems. This definition indicates one of the limitations of this technique: For parallel computing to be efficient, the task must be amenable to such decomposition into independently, partially computable sub-tasks.

Certain processing tasks involve operations that can be performed by a system's main processor, but that are so specialized that an auxiliary processor—a coprocessor—may instead be more efficient, thereby leaving the more general operations to the main processor. Coprocessors are thus frequently included in systems to perform such operations as floating point arithmetic, encryption, string processing, I/O interfacing, and signal and graphics processing. Such coprocessors may be locally and/or remotely attached.

The specialization of coprocessors offers many obvious advantages—they are, after all, designed to perform certain tasks especially well—but they also create challenges, especially when a main hardware platform is to be able to access more than one coprocessor, which may have different API protocols, may be distributed, that is, with some or all of them remote, may have unbalanced loading, etc. Even when only a single coprocessor is being accessed, there is the issue of how to deal with a failure of that coprocessor. What is needed is therefore a system and operational method that makes the use of one or more coprocessors more efficient in terms of reliability, availability, serviceability, etc.

DETAILED DESCRIPTION

In broad terms, embodiments provide a software middleware layer that, transparent to applications, allows those applications to use compute coprocessors such as graphics processing units (GPUs). These embodiments make possible capabilities such as scale-out, resource pooling, high availability, and memory virtualization that do not now exist for coprocessors and many applications that make use of coprocessors.

Figure 1:
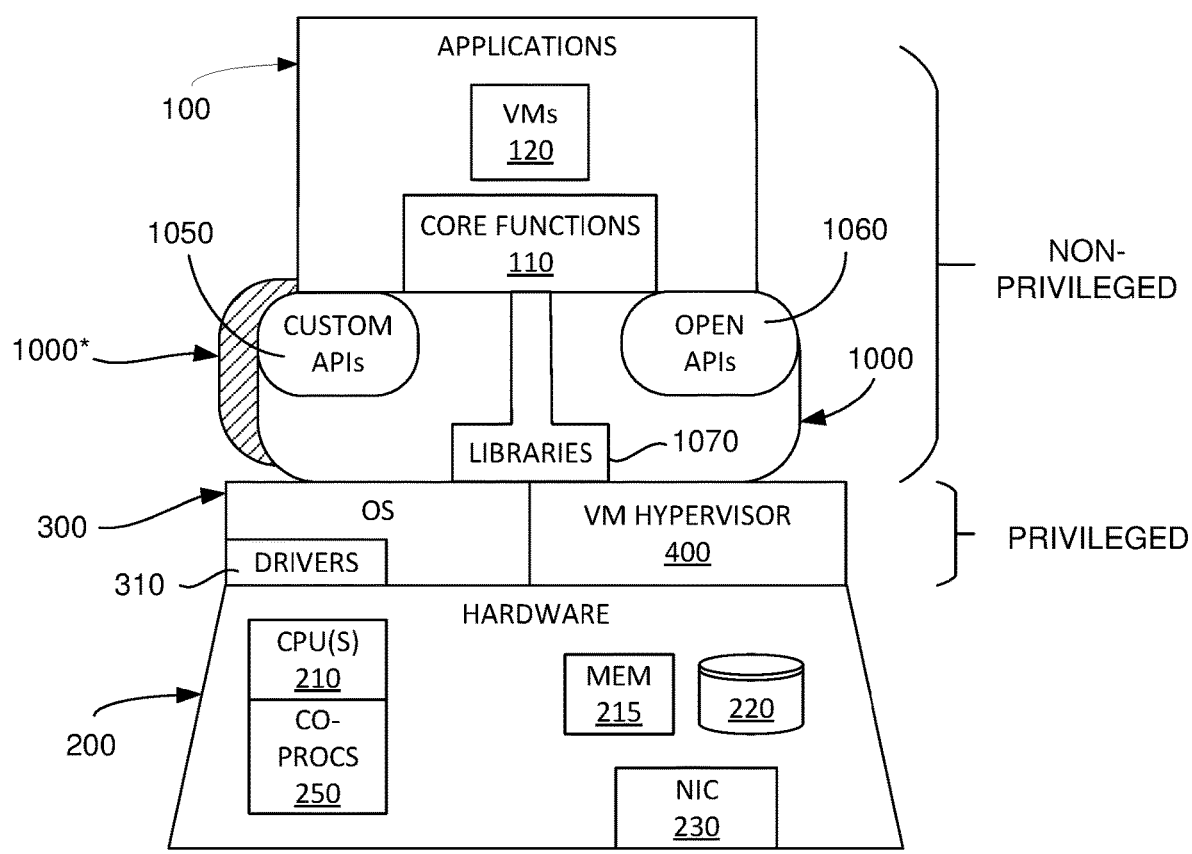
FIG. 1 illustrates where in a hardware/software stack embodiments of the invention operate in the context of use of coprocessors.

See FIG. 1, which illustrates one example of a hardware/software stack in which applications 100 run on a host hardware platform 200, typically under the control of a system software layer such as an operating system. In addition to other standard components, the hardware platform will include one or more processors 210, volatile (such as RAM 215) and usually non-volatile (such as SSD, disk, etc., 220) storage components, as well as components for communicating with other systems over a network and other peripherals as needed, for example, network interface components 230.

Depending on the configuration, the hardware platform 200 may also include one or more co-processors 250, such as GPUs; these may, however, also be located within other systems, accessible via any standard buses or networks, such that the concept of "hardware platform" may be broadened to include such "peripheral" or even remote coprocessors, such as coprocessors in cloud computing environments. Embodiments may also be used in other forms of distributed systems, such as a software-defined infrastructure (SDI). Although not shown, coprocessors may also have dedicated components of their own, such as memory. As FIG. 1 indicates by the "duplicated" or "stacked" privileged layers, the applications may also be running in a distributed processing environment, with more than one server handling processing tasks.

System software, such as a host operating system 300, is generally included to perform well-known functions, and will typically include drivers 310 that control communication with respective peripheral devices. The software—including the applications, the system software itself (and the interception layer 1000, described below)—that runs on the hardware platform is generally processor-executable code that is embodied in the storage components.

In many modern computing environments, the application layer 100 includes, and sometimes is even totally comprised of, one or more virtual machines (VMs) 120, in which case a system-level virtualization component such as a hypervisor 400 will typically also be included to act as the virtual-to-physical interface. In some systems, the hypervisor is co-resident with the host OS 300, with both operating in a privileged, kernel mode; in other systems, the host OS intermediates some or all hypervisor commands to the hardware; in still other systems the hypervisor replaces the host OS altogether; and in systems without virtualized components such as VMs, no hypervisor may be needed and included at all. Embodiments of this invention do not require VMs, although they may operate with VMs as with any other applications that call coprocessors such as GPUs; moreover, system programmers will be able to adapt embodiments to different host OS/hypervisor configurations, including those with no separate host OS at all.

Applications generally include various core functions 110, such as the routines needed to communicate processing requests to the operating system, to access the file system, allocate memory, and access common functional libraries for operations such as data compression, image manipulation, accelerated math functions, etc. In the context of embodiments of this invention, one function of some applications is to properly format and issue calls to application program interfaces (APIs). As is well known, an API comprises routines and protocols that specify how software components should interact, how a software component such as an application may interact with a hardware component, etc. Of particular relevance here is that an API is usually included to form an interface between applications 100 and coprocessors. By way of example only, graphical user interface (GUI) components are referred to below as being the type of coprocessor the applications are to call into via corresponding APIs.

As FIG. 1 indicates, system software and certain other components generally run at a "privileged" or "kernel" level, meaning that they are allowed to issue, and have executed, instructions that affect such things as storage protection settings, interrupt handling, scheduling, I/O coordination, special processor status- and register settings, etc. Applications, on the other hand, typically operate in a non-privileged user space, that is, in user mode.

In many systems, there is an intermediate software layer between applications and the system software. This layer, labeled 1000\* in FIG. 1, includes such components as application programming interfaces (APIs) libraries, both open and custom, and various system libraries. In systems that employ graphics processing units (GPUs), either for standard graphics tasks or in a GPGPU (General Purpose computing on GPUs) context, this layer may also include an API model such as the CUDA (Compute Unified Device Architecture) parallel computing platform provided by Nvidia, Inc., along with the associated libCUDA driver library.

This invention provides a software layer 1000, referred to here as the "interception layer", which may run at the non-privileged level, and which either mirrors the intermediate layer 1000\*, or is installed to act as such a layer. As the name implies, the interception layer 1000 intercepts API calls made by applications and changes them in a way that may introduce new functionality. Depending on the chosen implementation, the layer 1000 may include both custom APIs and generally available, open APIs 1060, as well as one or more libraries 1070, which list application features, enumerate available devices/platforms, etc., and which may be provided by vendors, or compiled heuristically, or both. Compute APIs, specifically, deal with the management of coprocessors, execution flow, and data movement, to make full and efficient use of the coprocessors. This includes dispatching data and compiled compute routines, returning status, and synchronizing streams of execution between the coprocessors and other coprocessors, and the coprocessors and the host system.

The interception layer 1000 is preferably configured so as not to require any changes to the applications running above, or modifications to the system software on which the layer itself runs. In other words, embodiments may run on commodity systems. Although this configuration leads to advantages such as ease of installation and use, portability, universality, and convenience, other configurations are possible. For example, the interception layer could be installed at the privileged level, and could even be incorporated into system software, in the OS or hypervisor.

The code that comprises the interception layer may be installed in the system and configured to intercept application calls using any known method, including downloading it from a network, reading in the code from a tangible, non-volatile storage medium, etc. This is in fact one advantage of the invention: It may be installed like other user-level applications, including applications that interact with other applications, with no need to modify the system software or include dedicated or modified hardware.

Figure 2:
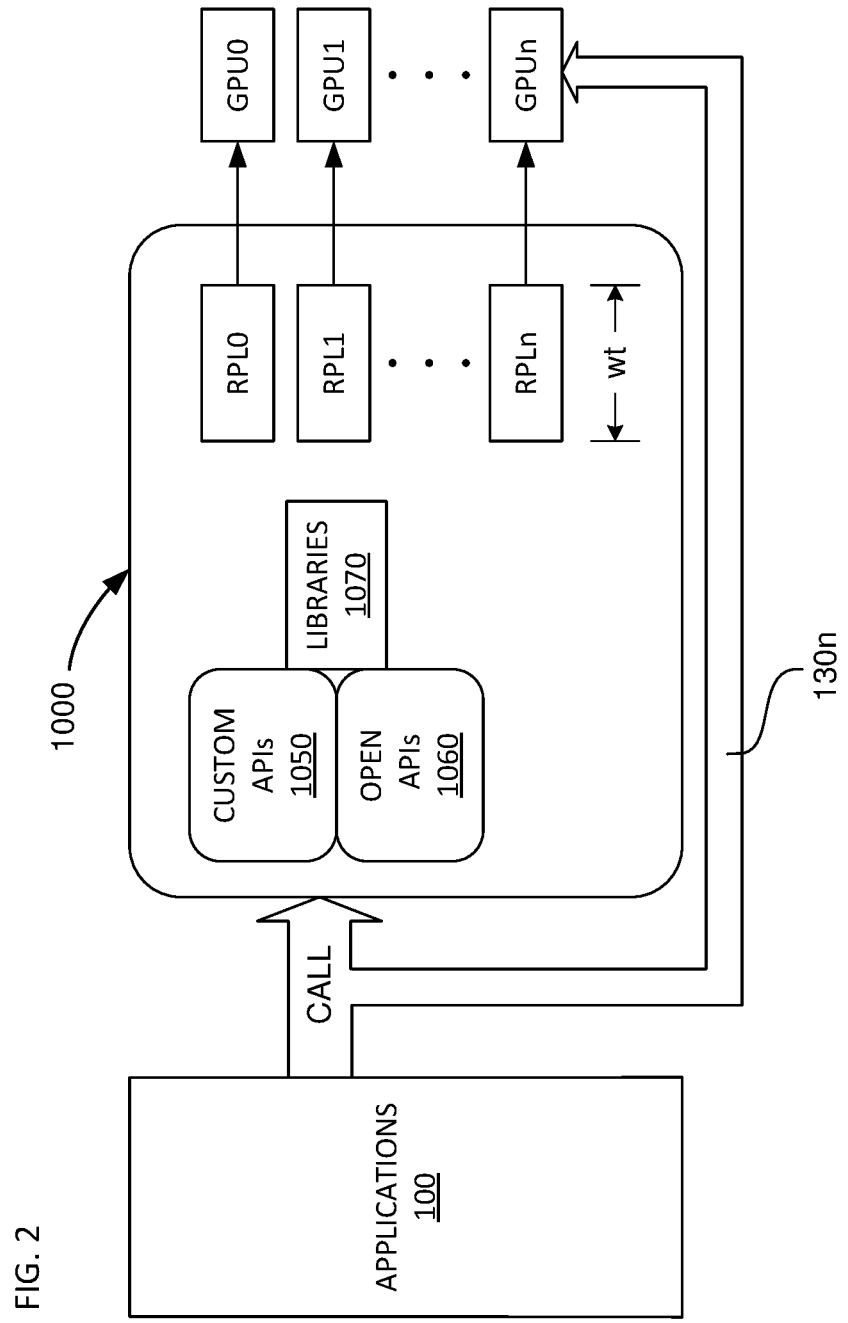
FIG. 2 illustrates how embodiments intercept, at an API level, operation calls to coprocessors.

See FIG. 2, which shows an example embodiment in which applications issue calls that are intercepted by the layer 1000, which directs the calls according to rules (see below) to one or more coprocessors. Embodiments of this invention may be used to advantage with substantially any known type of co-processor, many examples of which are mentioned above. Merely by way of a common example, embodiments are explained below and illustrated for the case in which the coprocessors are GPUs GPU1, GPU2, . . . , GPUn. If any modifications are needed at all to adapt a particular embodiment for use with another type of coprocessor, these adaptations will be within the skill of system architects.

Coprocessors typically have a "master-slave" relationship relative to the normal host CPU(s) 210 that runs the applications—an application is typically run on the host CPU(s) while certain computational tasks are offloaded to coprocessors for increased performance. Compute APIs, that is, APIs that are used by applications to leverage coprocessors, have explicit functions to offload computation and move data between host memory and coprocessor device memory.

The API for each coprocessor, such as a GPU, accessible by the overall system, is known and exposed to the applications that may wish to use them. Some of these APIs will be open, that is, public, whereas others may be customized for certain coprocessors. Even in the case of customized APIs, however, these will be known to all applications that may need to use the corresponding coprocessor. Since the coprocessors available at any given time are known to the system, their APIs are also known. As is known, applications 100 are programmed to properly format API calls to the coprocessors they wish to use and in many cases, the APIs that each application will call into may also be known in advance.

The interception layer 1000 includes the set of APIs, both custom and open, in respective components 1050, 1060, so as to be able to intercept the calls from applications and correctly interpret them and pass on calls with the proper formatting to the respective GPU. As mentioned, the set of APIs used by many applications is known in advance. Applications issuing calls via the OS 300 are identifiable using known methods even to the interception layer, which may therefore include libraries 1070 of the APIs needed by each application 100 in the system. As mentioned above, examples of such libraries include system libraries, and those offered by the OS, libraries that provide logging, image manipulation, compression, networking access, interprocess communication, etc. Alternatively, or in addition, the interception layer may build up the libraries 1070 by registering in them the APIs that the applications 100 actually call.

The interception layer 1000 includes, for each GPU, a corresponding replay log RPL0, RPL1, . . . , RPLn, which may be implemented either as portions of the space of the system memory 215 or any other memory component, either local to the host hardware or remote. To access coprocessors such as the GPUs, applications issue calls that comprise respective command and data streams. Using known methods, the interception layer intercepts these streams and collects them in replay logs RPL0, RPL1, . . . , RPLn provided on a per-GPU basis. Using known methods, the interception layer also captures—"checkpoints"—the execution state of the respective GPU. The interception layer may store this execution state in the form of state and context data structures that are typically maintained by the respective compute API (for example, CUDA, OpenCL, etc.).

As each GPU application runs, the layer 1000 collects the respective command and data stream in the replay log associated with that GPU. Each replay log RPL0, RPL1, . . . , RPLn is preferably sized so as, at a minimum, to be able to store all of the transactions directed to its corresponding GPU since a most recent synchronization point Ft. Note that, when it comes to coprocessors, such synchronizations points are generally well-defined, since the instruction and data stream directed to a coprocessor such as a GPU is typically "linear", without conditional branching or time-dependent processing paths, and corresponds to discrete processing tasks having known beginning and end points. As such, if a GPU fails after a synchronization point, it is possible to restart the failed processing segment from the most recent synchronization point as long as all of the instruction and data stream from point Ft onward to the point of failure is available. A window wt, defined in terms of time or number of instructions, between consecutive synchronization points is therefore knowable in advance for each GPU, such that the replay logs may be configured so as never to have a potential "gap".

Synchronization points for GPUs are similar to other forms of "checkpointing" in that the state of the GPU memory is also known at each synchronization point. In embodiments of the invention, the GPU memory is preferably shadowed, using known mechanisms, in host memory 215, on one or more other GPUs, on other host platforms, or even on the file system. Shadowing is preferably two-way, such that if the host makes changes to memory in the shadow region, these changes will be communicated to the GPU, and vice versa. This memory synchronization may be done using any known mechanism, such as by using a conventional unified virtual memory driver for GPUs. This means that, at each synchronization point and forward to the next, the entire state of each GPU can be replicated based on the shadowed memory state and the logged instruction stream from that point.

It is not necessary for the command and data stream for a given GPU to enter and exit the corresponding replay log to be executed by the target GPU device; rather, as indicated by the active, direct stream 130n (for GPUn, with similar paths for other GPUs), the replay log can collect the stream in parallel to the active stream.

Figure 3:
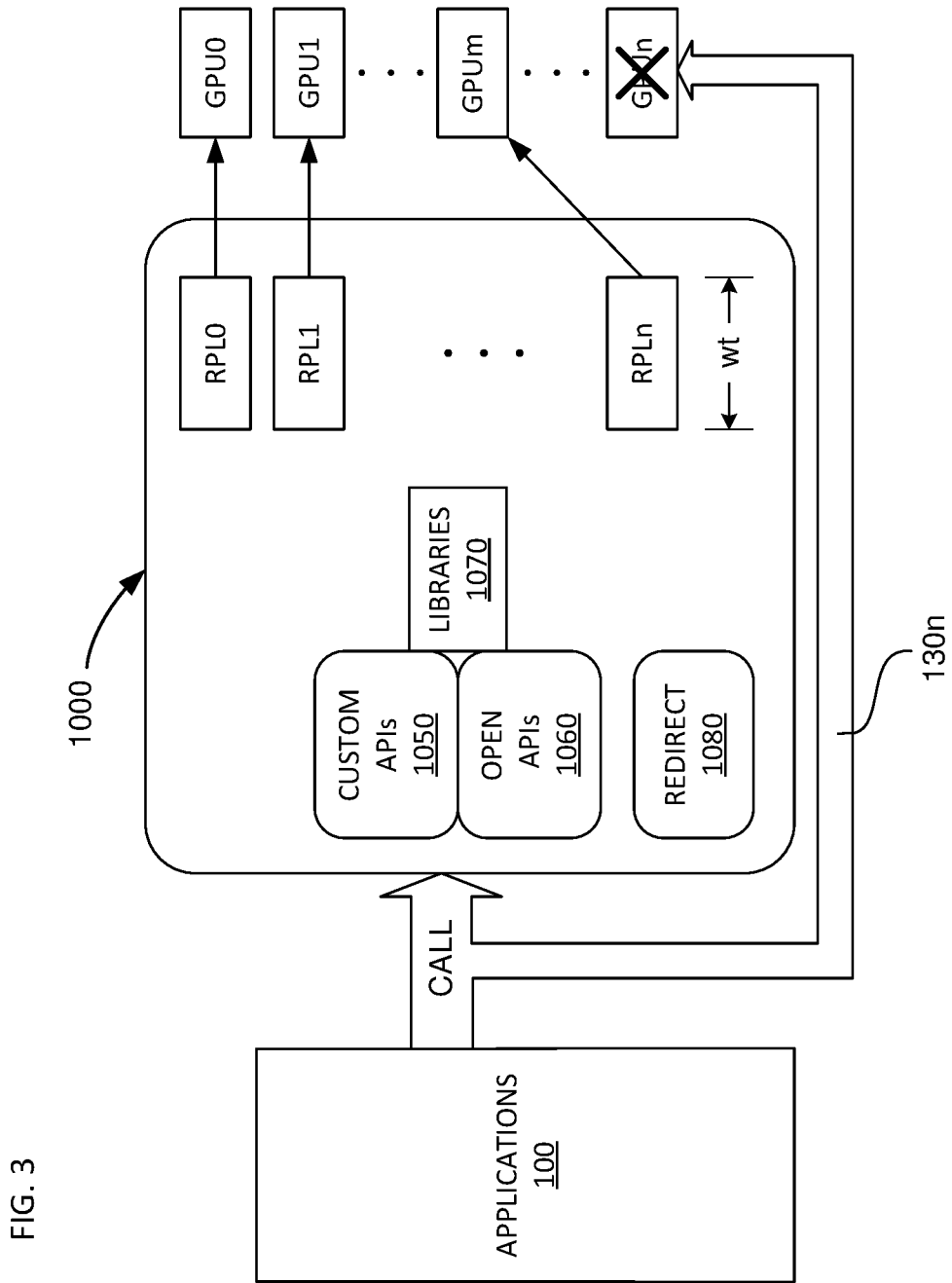
FIG. 3 illustrates re-direction of coprocessor requests in the event of a failure.

Now see FIG. 3 and assume that one of the coprocessors, for example, GPUn has failed or that the connection with it has failed, such that it cannot process the instructions and data from one or more of the applications 100. There are several types of GPU failure, which include, without limitation, any failure that can be detected at runtime such as: memory, power, execution, thermal, data corruption, interconnect failures resulting in incorrect operation. The physical and logical state information of the GPU indicating such failures may generally be detected at the application programming interface (API) level, but could be detected by the interception layer by other conventional means including, but not limited to, sensing a signal from the associated driver, by sensing interrupts, polling of the GPU device, etc.

Upon failure of a GPU in use, a redirection module 1080 within the interception layer 1000 first signals either the corresponding application 100 directly, or via the operating system, to pause execution of the application and then selects another, currently operational GPU according a redirection policy. This policy may be chosen in any manner, examples of which include random selection, a policy based on a utility function such as the current computational load of all GPUs in the system (for load balancing, for example), or of the least loaded GPU, based on required GPU speed, to reduce power consumption or heat, or of a degree of GPU dissimilarity (to reduce the likelihood of correlated failures), etc. This information may be programmed into the interception layer (such as in the module 1080) by an administrator, or sensed via either the corresponding API, via the system software, or any other known mechanisms.

Assume that GPUm is selected to take over from the failed GPUn. The data and instruction stream for failed GPUn since the most recent synchronization point will be stored in RPLn, and other state information for GPUn will also be available as described above. The interception layer thus assigns the replay log RPLn of the failed GPUs to the new target GPUm, and directs the stream of instructions and data in RPLn to GPUm for execution. The replay log RPLn is thus drained into GPUm, at which point the application that was paused may be signaled to continue its execution without interruption.

In some cases, an application will specify which GPU it wishes to access simply by virtue of the API call it makes; in other cases, the API call may be to a specific type of GPU, but the OS may nominally be set to make an allocation of the GPU resource. Assuming that more than one GPU is able to handle the request, however, it would not be necessary to wait for a GPU failure to switch the application-GPU assignment; rather, based on some metric or other criterion, such as the GPU load imbalance being greater than some threshold, the interception layer could use the replay log of an overloaded GPU to enable forward computing progress until the application can be directed to call to a different GPU starting at the next synchronization point (if the window wt is wide enough to accommodate the entire stream from one synchronization point to the next), or starting at the point at which the RPL has been drained; the application's API stream can then also be changed to be logged in the replay log of the new GPU.

Use of the replay logs to affect a change in the application-GPU assignment may be advantageous even in other situations. In particular, coprocessor redirection could be initiated for reasons other than coprocessor failure or unavailability. For example, assume that one or more additional GPUs is made available in runtime, for example through remote network attachment. For each such additional GPUj, the interception layer may create a corresponding replay log for GPUj and redirect calls to a previously available GPU to one of the new ones. This might also be for the purpose of load balancing. In another embodiment, the interception layer may be used to improve the performance of the GPU-calling application 100 by splitting the application's command stream to two separate GPUs. Even this embodiment may be extended by using the replay logging of the interception layer to implement GPU RAID capabilities such as mirroring, striping, and error correction in multiple configurations. As other examples, coprocessor redirection could be initiated by the interception layer, or by system software, to improve measured performance, power consumption, GPU uptime, etc. Since the command and data stream from an application is intercepted it can be manipulated, split and mirrored in virtually any combination that allows for improved RAS (reliability, availability, serviceability), performance, and cost.

Logging of the instruction and data stream for a particular GPU may also be prospective: Note that the stream for a coprocessor such as a GPU is substantially "deterministic" in the sense that there are typically no conditional branches or jumps—in a compute API, all data accesses are explicit, so there is no need to guess what the next block will be. This means that all or part of an application's API call stream, through to the next synchronization point, can be prefetched, assuming it is in a memory space accessible and known to the interception layer, for example, through address pointers in the API call. Many provisioning systems now assume some shared memory. For example, coprocessors now typically have two memory spaces (host vs coprocessor, coprocessor 1 vs coprocessor, etc.) that must be kept coherent, but which may also be accessed by the interception layer. Note that, in a compute API, commands can be dispatched that don't have to execute immediately to make progress.

Embodiments of the invention have several features not found in the prior art, and offer corresponding benefits. For example, the interception layer may run in user space, that is, not necessarily in system software such as an OS or hypervisor, or in an application 100. Thanks to this, the invention can be portable, installed in a wide range of environments.

Moreover, because the interception layer may run in a non-privileged execution mode, security and data confidentiality may be enforced without compromising the system with additional privileged code. Furthermore, unlike other approaches, additional features can be introduced into the interception layer without having to change the underlying operating system, drivers, or virtual machine hypervisors.

One main reason that systems include coprocessors such as GPUs is to increase processing speed. Assume that a GPU application 100 is running slowly. According to prior art methods, one must analyze code to understand how much time is spent on the GPU and the cost for computation and data transfer. To save time, such known systems typically change the application code such that, while computing a current batch, the next batch is being fetched. Embodiments of this invention, in contrast, may implement automatic pipelining, using the replay logs, and do this automatically, for practically any application, with no need to change code. This may therefore provide a performance advantage even for badly written code.

What is claimed is:

1. A data processing method comprising:
associating a plurality of replay logs respectively with a plurality of physical coprocessors, which include a first physical coprocessor; and
using an interception layer installed in a non-privileged, user space, executing the steps of:
intercepting a data and command stream issued by an application, which is running on at least one processor and the plurality of physical coprocessors, to an application program interface (API) of the first physical coprocessor for execution of the intercepted data and command stream on the first physical coprocessor, and acquiring and storing execution state information for the first physical coprocessor;
storing at least a portion of the intercepted data and command stream in a replay log associated with the first physical coprocessor;
detecting a redirection condition, which is one of: (1) the first physical coprocessor failing or otherwise being unavailable to service the stored portion of the intercepted data and command stream, (2) a new physical coprocessor being made available to the interception layer during runtime of the application, (3) computational loads among the plurality of physical coprocessors being determined to be unbalanced, (4) the ability to divide the intercepted data and command stream into a plurality of parts to be executed simultaneously, and (5) the ability to decrease power consumption of the plurality of physical coprocessors or to increase processing speed of the stored portion of the intercepted data and command stream by redirecting execution of the stored portion of the intercepted data and command stream; and
in response to detecting the redirection condition: selecting one of the plurality of physical coprocessors other than the first physical coprocessor as a second physical coprocessor, and then reading out from the replay log associated with the first physical coprocessor the stored portion of the intercepted data and command stream and submitting the stored portion of the intercepted data and command stream, as well as the stored execution state information, to the second physical coprocessor for the second physical coprocessor to service the stored portion of the intercepted data and command stream instead of the first physical coprocessor.

2. The method of claim 1, in which the stored portion of the intercepted data and command stream in the replay log associated with the first physical coprocessor is a portion of the intercepted data and command stream from a most recent synchronization point.

3. The method of claim 1, further comprising pre-fetching part of the intercepted data and command stream and storing the pre-fetched part in the replay log associated with the first physical coprocessor.

4. The method of claim 1, in which the second physical coprocessor is selected according to a utility policy.

5. The method of claim 4, in which the utility policy is a function of relative loads of the plurality of physical coprocessors.

6. The method of claim 4, in which the utility policy is a function of relative speeds of the plurality of physical coprocessors.

7. The method of claim 4, in which the utility policy is a function of degrees of dissimilarity between the first physical coprocessor and others of the plurality of physical coprocessors.

8. The method of claim 1, in which the first and second physical coprocessors are graphics processing units.

9. A data processing system comprising:
at least one processor;
at least one application comprising computer-executable code executable on the at least one processor;
a plurality of physical coprocessors including a first physical coprocessor; and
an interception layer installed in a non-privileged, user space and logically located between the at least one application and the plurality of physical coprocessors, said interception layer including a plurality of replay logs associated respectively with the plurality of physical coprocessors, and said interception layer being provided:

for intercepting a data and command stream issued by the at least one application to an application program interface (API) of the first physical coprocessor for execution of the intercepted data and command stream on the first physical coprocessor, and for acquiring and storing execution state information for the first physical coprocessor;

for storing at least a portion of the intercepted data and command stream in a replay log associated with the first physical coprocessor;

for detecting a redirection condition, which is one of: (1) the first physical coprocessor failing or otherwise being unavailable to service the stored portion of the intercepted data and command stream, (2) a new physical coprocessor being made available to the interception layer during runtime of the at least one application, (3) computational loads among the plurality of physical coprocessors being determined to be unbalanced, (4) the ability to divide the intercepted data and command stream into a plurality of parts to be executed simultaneously, and (5) the ability to decrease power consumption of the plurality of physical coprocessors or to increase processing speed of the stored portion of the intercepted data and command stream by redirecting execution of the stored portion of the intercepted data and command stream; and in response to detecting the redirection condition: for selecting one of the plurality of physical coprocessors other than the first physical coprocessor as a second physical coprocessor, and then for reading out from the replay log associated with the first physical coprocessor the stored portion of the intercepted data and command stream and submitting the stored portion of the intercepted data and command stream, as well as the stored execution state information, to the second physical coprocessor for the second physical coprocessor to service the stored portion of the intercepted data and command stream instead of the first physical coprocessor.

10. The system of claim 9, in which the stored portion of the intercepted data and command stream in the replay log associated with the first physical coprocessor is a portion of the intercepted data and command stream from a most recent synchronization point.

11. The system of claim 9, in which the interception layer is further provided for pre-fetching part of the intercepted data and command stream and for storing the pre-fetched part in the replay log associated with the first physical coprocessor.

12. The system of claim 9, in which the second physical coprocessor is selected randomly.

13. The system of claim 9, in which the second physical coprocessor is selected according to a utility policy.

14. The system of claim 13, in which the utility policy is chosen to be a function of one or more of the group: relative loads of the plurality of physical coprocessors, relative speeds of the plurality of physical coprocessors, and degrees of dissimilarity between the first physical coprocessor and others of the plurality of physical coprocessors.

15. The system of claim 9, in which the first and second physical coprocessors are graphics processing units.

16. The system of claim 9, in which the interception layer is further provided for intercepting and storing the stored portion of the intercepted data and command stream at the same time as the at least one application communicating the intercepted data and command stream directly to the first physical coprocessor.

17. The system of claim 9, in which the interception layer is installed in the non-privileged, user space, without modification of the at least one application or of kernel-level software running on the at least one processor, said plurality of replay logs associated respectively with the plurality of physical coprocessors being data structures stored within the interception layer, and said intercepting of the intercepted data and command stream and said submitting of the stored portion of the intercepted data and command stream to the second coprocessor being done by software components within the interception layer.

18. The system of claim 17, further comprising at least one API component within the interception layer wherein a plurality of APIs corresponding to the plurality of physical coprocessors are stored.

19. A data processing system comprising:
a central processing unit (CPU);
a plurality of graphics processing units (GPUs), the plurality of GPUs including a first GPU;
at least one application comprising computer-executable code executable on the CPU; and
an interception layer logically located between the at least one application and the plurality of GPUs, and including a plurality of replay logs associated respectively with the plurality of GPUs, wherein the interception layer is executed on the CPU to:
intercept a data and command stream issued by the at least one application to an application program interface (API) of the first GPU for execution of the intercepted data and command stream on the first GPU, and acquire and store execution state information for the first GPU;
store at least a portion of the intercepted data and command stream in a replay log associated with the first GPU;
detect a redirection condition, which is one of: (1) the first GPU failing or otherwise being unavailable to service the stored portion of the intercepted data and command stream, (2) a new GPU being made available to the interception layer during runtime of the at least one application, (3) computational loads among the plurality of GPUs being determined to be unbalanced, (4) the ability to divide the intercepted data and command stream into a plurality of parts to be executed simultaneously, and (5) the ability to decrease power consumption of the plurality of GPUs or to increase processing speed of the stored portion of the intercepted data and command stream by redirecting execution of the stored portion of the intercepted data and command stream; and
in response to detecting the redirection condition: select one of the plurality of GPUs other than the first GPU as a second GPU, and then read out from the replay log associated with the first GPU the stored portion of the intercepted data and command stream and submit the stored portion of the intercepted data and command stream, as well as the stored execution state information, to the second GPU for the second GPU to service the stored portion of the intercepted data and command stream instead of the first GPU.

* * * * *